United States Patent
Shimomura et al.

(10) Patent No.: US 6,769,689 B1
(45) Date of Patent: Aug. 3, 2004

(54) TURN-TABLE ADAPTER CAPABLE OF BEING ATTACHED TO A GAME DEVICE AND PORTABLE GAME DEVICE USING THE SAME

(75) Inventors: Satoshi Shimomura, Tama (JP); Masayuki Takahashi, Tokyo-to (JP)

(73) Assignee: Konami Co., Ltd., Tokyo-to (JP)

( * ) Notice: Subject to any disclaimer, the term of this patent is extended or adjusted under 35 U.S.C. 154(b) by 0 days.

(21) Appl. No.: 09/510,754

(22) Filed: Feb. 22, 2000

(30) Foreign Application Priority Data

Feb. 26, 1999 (JP) .......................................... P11-050900
Mar. 18, 1999 (JP) .......................................... P11-073580

(51) Int. Cl.[7] .............................. A63F 9/22; G09G 5/08
(52) U.S. Cl. ....................... 273/148 B; 463/37; 345/184
(58) Field of Search ................................ 463/46–47, 1, 463/23, 36, 7, 43; 273/148 R, 148 B; 345/156, 157, 160, 161, 184

(56) References Cited

U.S. PATENT DOCUMENTS

| | | | | |
|---|---|---|---|---|
| 4,575,591 A | * | 3/1986 | Lugaresi | ..................... 200/6 A |
| 4,786,768 A | * | 11/1988 | Langewis et al. | ........... 200/6 A |
| 5,091,832 A | * | 2/1992 | Tortola et al. | .............. 362/109 |
| 5,204,511 A | * | 4/1993 | Baitz et al. | ............. 235/145 R |
| 5,317,336 A | * | 5/1994 | Hall | ........................... 345/164 |
| 5,343,219 A | | 8/1994 | DuBosque, Jr. | ............. 345/160 |
| 5,350,882 A | * | 9/1994 | Koguchi et al. | .............. 84/636 |
| 5,808,602 A | * | 9/1998 | Sellers | ........................ 345/157 |
| 5,883,690 A | * | 3/1999 | Meyers et al. | .............. 345/161 |
| 5,976,018 A | * | 11/1999 | Druckman | ................... 463/47 |
| 6,322,449 B1 | * | 11/2001 | Klitsner et al. | ............... 463/37 |
| 6,379,244 B1 | * | 4/2002 | Sagawa et al. | ................. 463/7 |
| 6,636,197 B1 | * | 10/2003 | Goldenberg et al. | ........ 345/156 |

FOREIGN PATENT DOCUMENTS

| | | |
|---|---|---|
| EP | 0903169 | 3/1999 |
| WO | WO9737736 | 10/1997 |

* cited by examiner

Primary Examiner—Mark Sager
Assistant Examiner—Steven Ashburn
(74) Attorney, Agent, or Firm—Jordan and Hamburg LLP (57) ABSTRACT

A game device is a turn-table adapter having a clip mountable on a case, a shaft passing through one arm of the clip, an operation disk coaxially provided to the shaft at one end thereof, and a press-in disk coaxially provided to the shaft at another end thereof. Another arm of the clip is optionally provided with a bump to be fitted to a hole formed on the case to serve as an element necessary for assembling the game device. A bottom surface of the press-in disk opposite to a press-switch is formed with a bump which engages the press-switch to thereby depress the press-switch.

16 Claims, 11 Drawing Sheets

ADDRESS TABLE OF TUNE X

| BLOCK 1 | ADDRESS | T1 |
|---------|---------|----|
| BLOCK 2 | ADDRESS | |
| BLOCK 3 | ADDRESS | |
| ⋮ | ⋮ | |
| BLOCK X | ADDRESS | |

FIG. 10

TABLE FOR CREATING TUNE X

| BLOCK 1 | TYPE | T2 |
|---------|------|----|
| BLOCK 2 | TYPE | |
| BLOCK 3 | TYPE | |
| ⋮ | ⋮ | |
| BLOCK X | TYPE | |

FIG.11A

DATA FOR CREATING A MEDLEY D5

FIG.11B

TUNE A DATA

FIG.11C

DATA OF BLOCK AN

FIG.12

TURN-TABLE ADAPTER CAPABLE OF BEING ATTACHED TO A GAME DEVICE AND PORTABLE GAME DEVICE USING THE SAME

BACKGROUND OF THE INVENTION

1. Field of the Invention

The present invention relates to a turn-table adapter capable of being attached to a game device for executing games intended to be played in time with music.

2. Description of the Related Art

Recently, a music game system in which a player is instructed to operate an input device in time with music for simulating a DJ (disk jockey) and performance on various musical instruments has become popular. However, input devices for general types of game devices are equipped only with press-switches and they are not sufficient to play music oriented games.

SUMMARY OF THE INVENTION

Accordingly, it is an object of the present invention to provide a turn-table adapter suitable for use in music oriented games.

In order to attain the above-mentioned object, there is provided a turn-table adapter comprising a body capable of being attached to a game device provided with a press-switch serving as an operation member of an input device, and a mechanism for converting a rotational operation by a player into a pushing-down operation of the press-switch.

According to the above mentioned turn-table adopter, it is possible to allow the game player to perform rotational operations in time with the music, so that interests of music oriented games can be improved.

According to another aspect of the present invention, there is provided a turn-table adapter capable of being attached to a game device provided with a press-switch serving as an operation member of an input device, said turn-table adapter comprising: a clip to be detachably mounted on a case of the game device; and an operation disk attached to one arm of the clip and rotatably operable by a player, wherein a rotational operation of the operation disk can be converted into a pushing-down operation of the press-switch.

In the turn-table adapter, the clip may be provided with a shaft passing through said one arm, the shaft may be coaxially provided at both ends thereof with the operation disk and a press-in disk, and a lower surface of the press-in disk opposite to the case may be provided with a bump for depressing the press-switch.

A bottom surface of the operation disk opposite to said one arm may be formed as an end face cam, said one arm may be provided with a pin movable in an axial direction of the operation disk, and a rotation of the operation disk may be converted into a movement of the pin in the axial direction to thereby depress the press-switch.

The case may be provided with an element necessary for assembling the game device, and the clip may be mounted on the case using said element.

The case may be provided with a hole serving as an element necessary for assembling the game device, and another arm of the clip may be provided with a bump to be fitted to the hole.

According to still another aspect of the present invention, there is provided a turn-table adapter capable of being attached to a game device provided with a press-switch serving as an operation member of an input device, said turn-table adapter comprising: a clip mountable on a case of the game device; a shaft passing through one arm of the clip; an operation disk coaxially provided to the shaft at on one end thereof; and a press-in disk coaxially provided to the shaft at another end thereof, wherein another arm of the clip is provided with a bump to be fitted to a hole formed on the case to serve as an element necessary for assembling the game device, a bottom surface of the press-in disk opposite to the press-switch being formed with a bump, and an integral rotation of the operation disk and the press-in disk allowing the bump of the press-in disk to rise onto the press-switch to thereby depress the press-switch.

According to still further aspect of the present invention, there is provided a turn-table adapter capable of being attached to a game device provided with a press-switch serving as an operation member of an input device, said turn-table adapter comprising: a clip mountable on a case of the game device; a shaft attached to one arm of the clip; and an operation disk provided to the shaft at one end thereof, wherein said one arm is provided with a pin movable in an axial direction of the shaft, another arm of the clip being provided with a bump to be fitted to a hole formed on the case to serve as an element necessary for assembling the game device, a lower surface of the operation disk opposite to the press-switch being formed as an end face cam, and a rotation of the operation disk being converted into a movement of the pin in an up-and-down direction to thereby depress the press-switch.

In the above mentioned turn-table adapters, the game device may be configured as a portable game device.

It is another object of the present invention to provide a portable game device suitable to play music oriented games.

In order to attain the above mentioned object, there is provided a portable game device comprising: a case having a size approximately small enough to fit in a palm of an adult; a press-switch provided on the case and serving as an operation member of an input device; and a turn-table adapter to be detachably mounted on the case, said turn-table adapter being capable of converting a rotational operation by a player into a pushing-down operation of the press-switch.

According to the above mentioned portable game device, it is possible to allow the game player to perform rotational operations in time with the music, so that interests of music oriented games carried out on the portable game device can be improved.

According to another aspect of the present invention, there is provided a portable game device comprising: a case having a size approximately small enough to fit in a palm of an adult; a press-switch provided on the case and serving as an operation member of an input device; and a turn-table adapter comprising a clip to be detachably mounted on the case and an operation disk attached to one arm of the clip and rotatably operable by a player, wherein a rotational operation of the operation disk can be converted into a pushing-down operation of the press-switch.

In the portable game device, the clip may be provided with a shaft passing through said one arm, the shaft may be coaxially provided at both ends thereof with the operation disk and a press-in disk, and a lower surface of the press-in disk opposite to the case may be provided with a bump for depressing the press-switch.

A bottom surface of the operation disk opposite to said one arm may be formed as an end face cam, said one arm may be provided with a pin movable in an axial direction of the operation disk, and a rotation of the operation disk may be converted into a movement of the pin in the axial direction to thereby depress the press-switch.

The case may be provided with an element necessary for assembling the game device, and the clip may be mounted on the case using said element.

The case may be provided with a hole serving as an element necessary for assembling the game device, and another arm of the clip may be provided with a bump to be fitted to the hole.

According to another aspect of the present invention, there is provided a portable game device comprising: a case having a size approximately small enough to fit in a palm of an adult; a press-switch provided on the case and serving as an operation member of an input device; and a turn-table adapter comprising a clip mountable on the case, a shaft passing through one arm of the clip, an operation disk coaxially provided to the shaft at on one end thereof, and a press-in disk coaxially provided to the shaft at another end thereof, wherein another arm of the clip is provided with a bump to be fitted to a hole formed on the case to serve as an element necessary for assembling the game device, a bottom surface of the press-in disk opposite to the press-switch being formed with a bump, and an integral rotation of the operation disk and the press-in disk allowing the bump of the press-in disk to rise onto the press-switch to thereby depress the press-switch.

According to still another aspect of the present invention, there is provided a portable game device comprising: a case having a size approximately small enough to fit in a palm of an adult; a press-switch provided on the case and serving as an operation member of an input device; and a turn-table adapter comprising a clip mountable on the case, a shaft attached to one arm of the clip, and an operation disk provided to the shaft at one end thereof, wherein said one arm is provided with a pin movable in an axial direction of the shaft, another arm of the clip being provided with a bump to be fitted to a hole formed on the case to serve as an element necessary for assembling the game device, a lower surface of the operation disk opposite to the press-switch being formed as an end face cam, and a rotation of the operation disk being converted into a movement of the pin in an up-and-down direction to thereby depress the press-switch.

It is still another object of the present invention to provide a portable game device by which a game player can sufficiently enjoy the music oriented games.

In order to attain the above object, there is provided a portable game device comprising: a case having a size approximately small enough to fit in a palm of an adult; an input device provided on the case and having a plurality of operation members, for outputting signals in correspondence with operation states of the operation members, at least one of the operation members being arranged as a press-switch; a memory device in which is stored a music data for reproducing a tune, and a timing data defining a procedure for operating the operation members in correspondence with the tune reproduced base on the music data; a display device for displaying a game picture; a music reproducing device for reproducing the music data; a game controller for controlling the reproduction of the tune by the music reproduction device, and using the display device to guide a player in an operation procedure of the input device in correspondence with the reproduced tune; and a turn-table adapter to be detachably mounted on the case, said turn-table adapter being capable of converting a rotational operation by the player into a pushing-down operation of the press-switch.

DESCRIPTION OF THE PREFERRED EMBODIMENTS

Figure 1A:
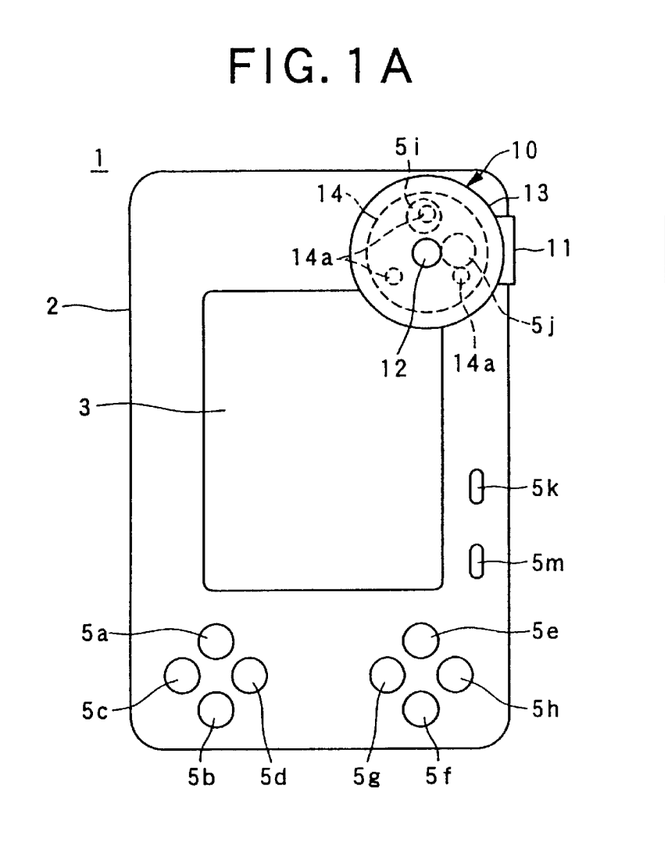
FIGS. 1A and 1B are diagrams showing the outside of a portable game device according to an embodiment of the present invention.
Figure 1B:
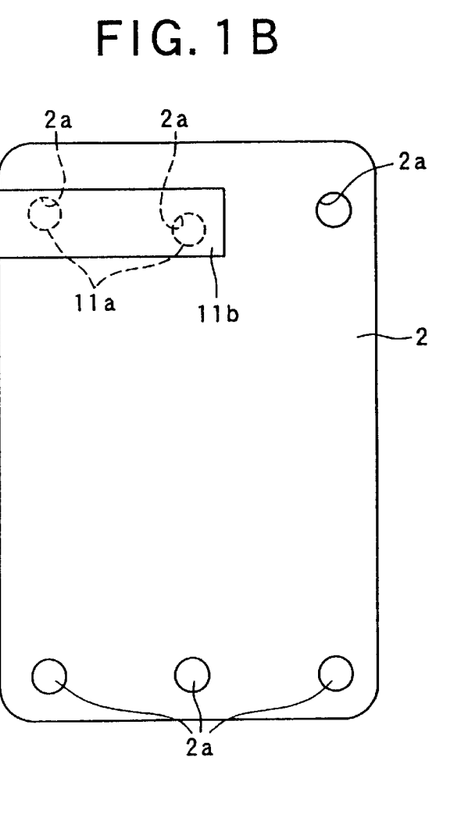

FIGS. 1A and 1B show the outside of a portable device for the music game according to an embodiment of the present invention. The game device 1 comprises a resin case 2. The case 2 is of a size approximately small enough to fit in a palm of an adult. A liquid crystal monitor 3 functions as a display device, and is provided in the center of the surface of the case 2. Various press-switches comprise operation members of an input device 4, and are provided around the monitor 3. The number and arrangement of the press-switches can be varied. The input device 4 shown in FIGS. 1A and 1B has two groups of four press-switches 5a to 5d, and 5e to 5h, provided in a cross-like formation at the bottom left and bottom right respectively of the monitor 3, two press-switches 5i and 5j, provided at the top right of the monitor 3, and two press-switches 5k and 5m, provided at the middle right of the monitor 3. In the following explanation, these press-switches will be represented collectively as the press-switches 5 where there is no need to distinguish among them.

Figure 2:
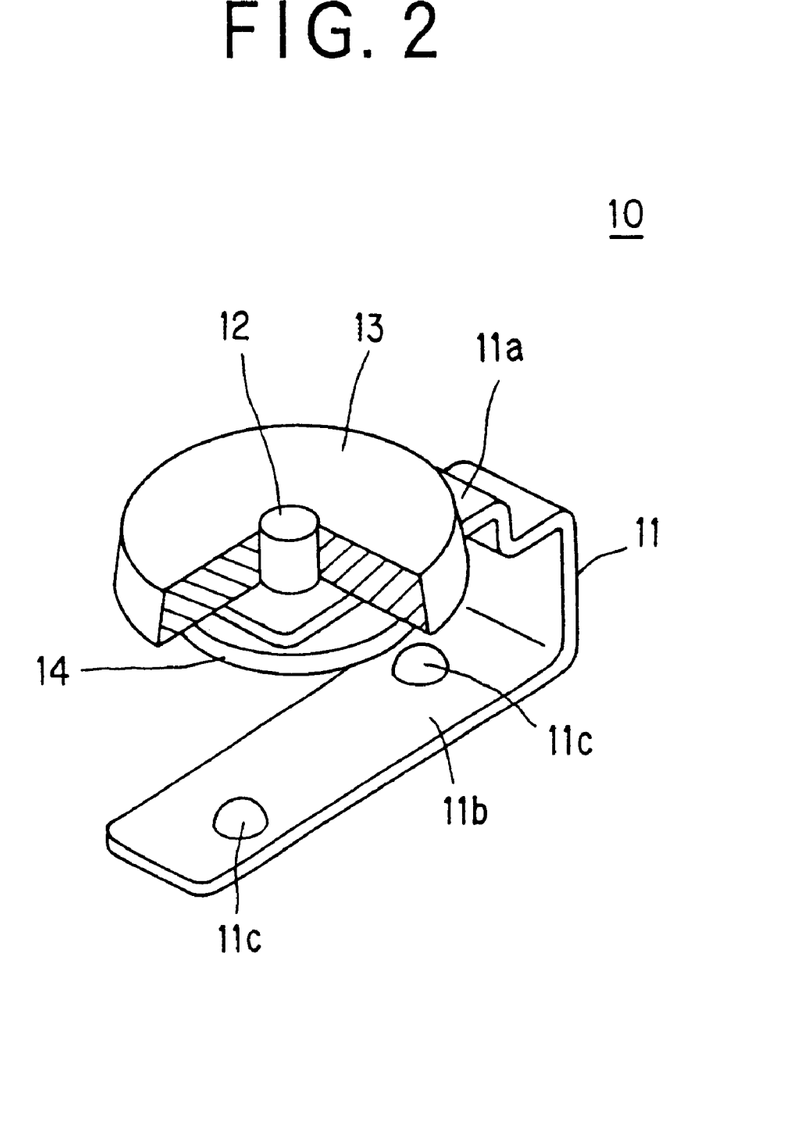
FIG. 2 is a perspective view of a turn-table adapter provided in the game device of FIG. 1.

A turn-table adapter 10 can be attached at the position where the press-switches 5i and 5j are provided. As shown in FIG. 2, the turn-table adapter 10 comprises a clip 11, a shaft 12 passing through one arm 11a of the clip 11, and a operation disk 13 and a press-in disk 14, provided coaxially to the shaft 12 at both ends thereof. A pair of bumps 11c and 11c is provided on the other arm 11b of the clip 11. The bumps 11c correspond to portion of multiple holes 2a . . . 2a on the back face of the case 2 shown in FIG. 1B. The holes 2a are needed in order to assemble the game device 1. For example, screws used for securing the top and bottom faces of the case 2 together, and for securing a wiring board inside the case 2, are provided in the holes 2a.

The clip 11 is clipped onto the case 2 so as to clasp it on either side, and the bumps 11c are fitted into the holes 2a, thereby securing the turn-table adapter 10 on the case 2 so that the press-in disk 14 covers the press-switches 5i and 5j. When the player rotates the operation disk 13 around the shaft 12 using his or her finger, bumps 14a . . . 14a provided on the bottom face of the press-in disk 14 rise onto the press-switches 5i and 5j, pushing them downwards. Consequently, the rotation operation of the operation disk 13 converted into a pushing-down operation of the press-switches 5i and 5j. Instead of the press-in disk 14, the press-switches 5i and 5j may be pressed by providing a pin which can move up and down (in the axial direction of the shaft 12) on the arm 11a of the clip 11, and converting the rotation of the operation disk 13 into a movement in the up-down direction of the pin, using the bottom face of the operation disk 13 as an end face cam.

In the game device 1 of the present embodiment, play is of course still possible when the turn-table adapter 10 has been removed. In the following description, if there is no particular explanation, the operation of the press-switches 5i and 5j is regarded as including those of rotation of disk 13 of the turn-table adapter 10, and of direct pressing of the press-switches 5i and 5j.

Figure 3:
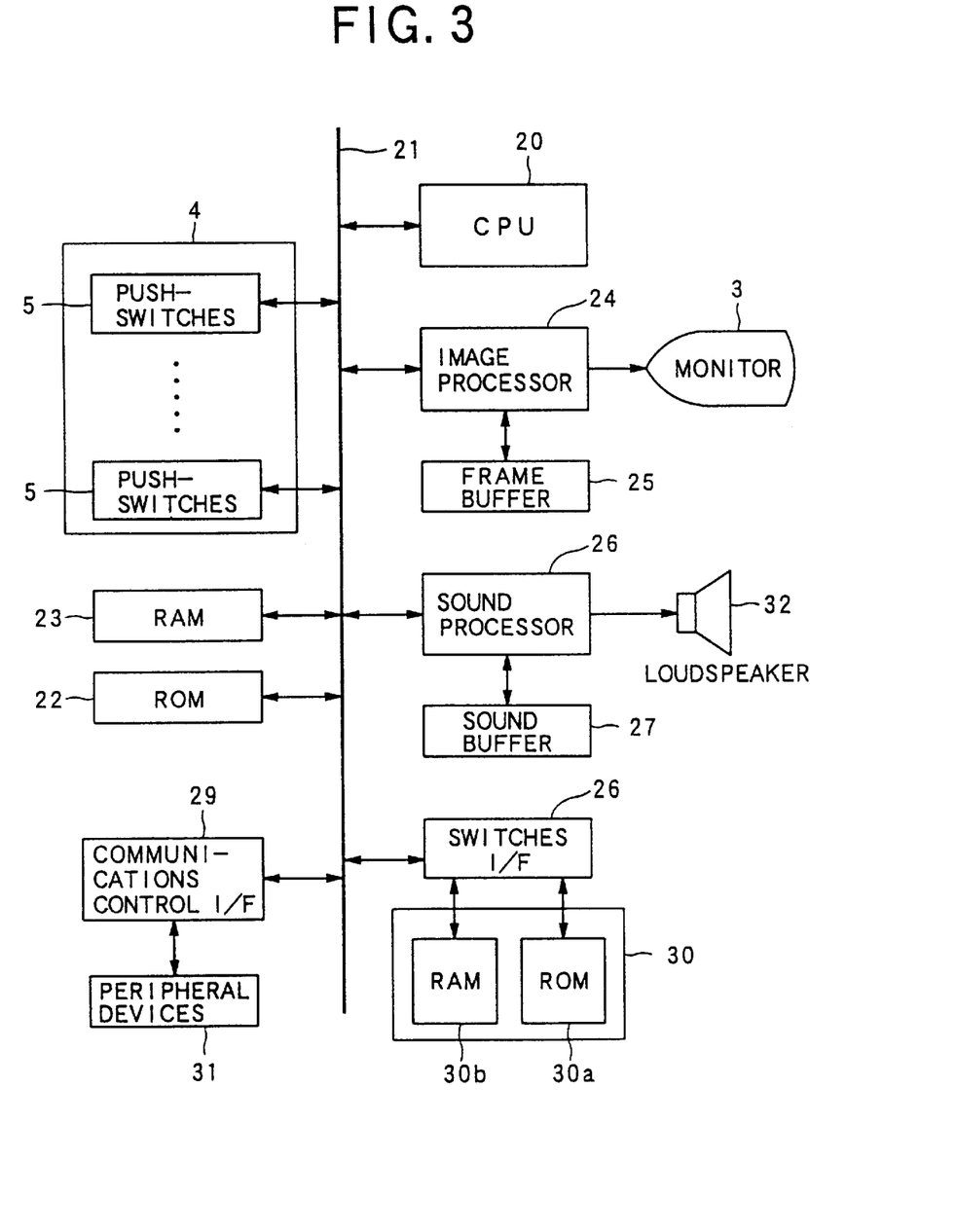
FIG. 3 is a block diagram showing a schematic constitution of a control system of the game device of FIG. 1.

FIG. 3 is a block diagram showing a schematic constitution of a control system of th e game device 1. The game device 1 has a CPU 20 mainly comprising a microprocessor. The press-switches 5 of the input device 4 described above are connected to the CPU 20 via an interface (not shown in the diagram) and a bus 21. In addition, main memory devices comprising a ROM 22 and a RAM 23, an image processor 24 and a sound processor 26, a cassette interface 28 comprising a cassette 30 as an auxiliary memory device, and a communications control interface 29 for connecting various types of peripheral devices 31, are connected via the same bus 21.

A system program required to start the game device 1 up i s written into the ROM 22. The cassette 30 comprises a ROM 30a, in which data and a program for the game are written, and a RAM 30b, in which data such as game results are stored. The ROM 30a and the RAM 30b each comprise a semiconductor memory, the programs and data stored therein being loaded to the RAM 23 as required. The ROM 30a and the RAM 30b are sometimes accessed directly by the CPU 20.

The image processor 24 receives an image data from the CPU 20 and paints a game screen on a frame buffer 25, and in addition, displays the painted image at a predetermined timing on the monitor 3. The sound processor 26 reproduces sound source data and data such as sound and music, read out from the RAM 23 and stored in predetermined regions of a sound buffer 27, and outputs them from a loudspeaker 32. In an alternative arrangement, the sound buffer 27 may be omitted, so that a PCM waveform is output directly in compliance with a command from the CPU 20.

The loudspeaker 32 is provided inside the case 2. The communications control interface 29 is connected to the communications cable or the like for carrying out data communications with peripheral device 31 such as a headphone adapter or another game device 1. When a headphone adapter is provided, the output from the sound processor 26 is supplied, not to the loudspeaker 32, but to the headphone via the communications control interface 29.

Figure 4:
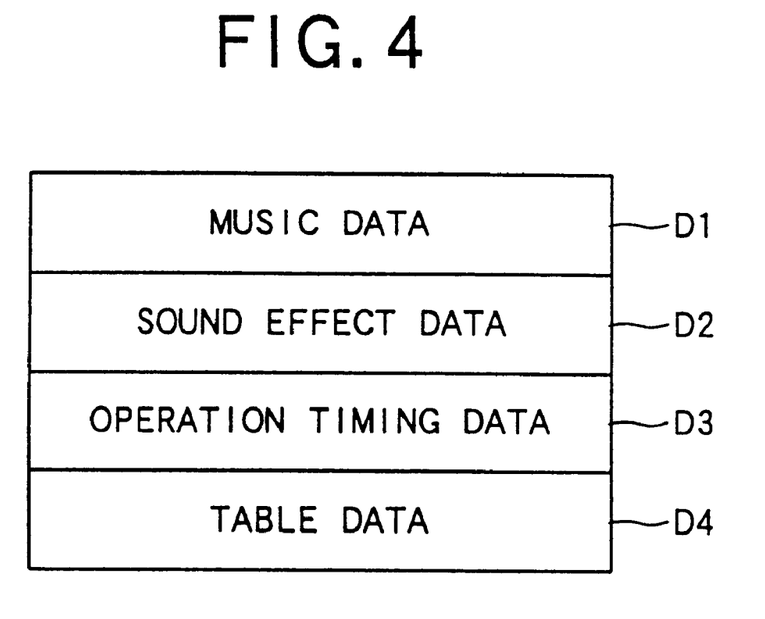
FIG. 4 is a diagram showing data store on a cassette for executing a music game on the game device of FIG. 1.

In the present embodiment, a predetermined music game is executed using the hardware described above. This music game simulates playing a DJ by operating the operation members 5 of the input device 4 in time with music performed as BGM. As shown in FIG. 4, music data D1 for reproducing music (tunes) used in the music game, sound effect data D2 for generating sound effects in correspondence with the music, operation timing data D3 defining a procedure for operating the input device 4 in time with the music, and table data D4 for arranging the music and sound effects in correspondence with the operation timings defined by the operation timing data D3, are stored in the ROM 30a of the cassette 30. In addition, image data and the like for displaying dancing scenes and the like on the monitor 3 in time with the music are also stored in the ROM 30a.

Multiple tunes are prepared, and their music data D1 are managed by appending a number for each tune. Multiple groups of operation timing data D3 are prepared, and their level of difficulty, for example, is changed in correspondence with the music data D1 of each tune. The music data D1 and the sound effect data D2 are compressed and stored in the ROM 30a, and after the compressed data have been developed as, for example, PCM data in a predetermined operation area of the RAM 23, they are passed to the sound processor 26 as a PCM sound source, and output from the loudspeaker 32. The music game of the present embodiment assumes that the operation members to be controlled in time with the music comprise five keyboards and one turntable, the operation timings for each operation member being defined by the operation timing data D3.

Figure 5:
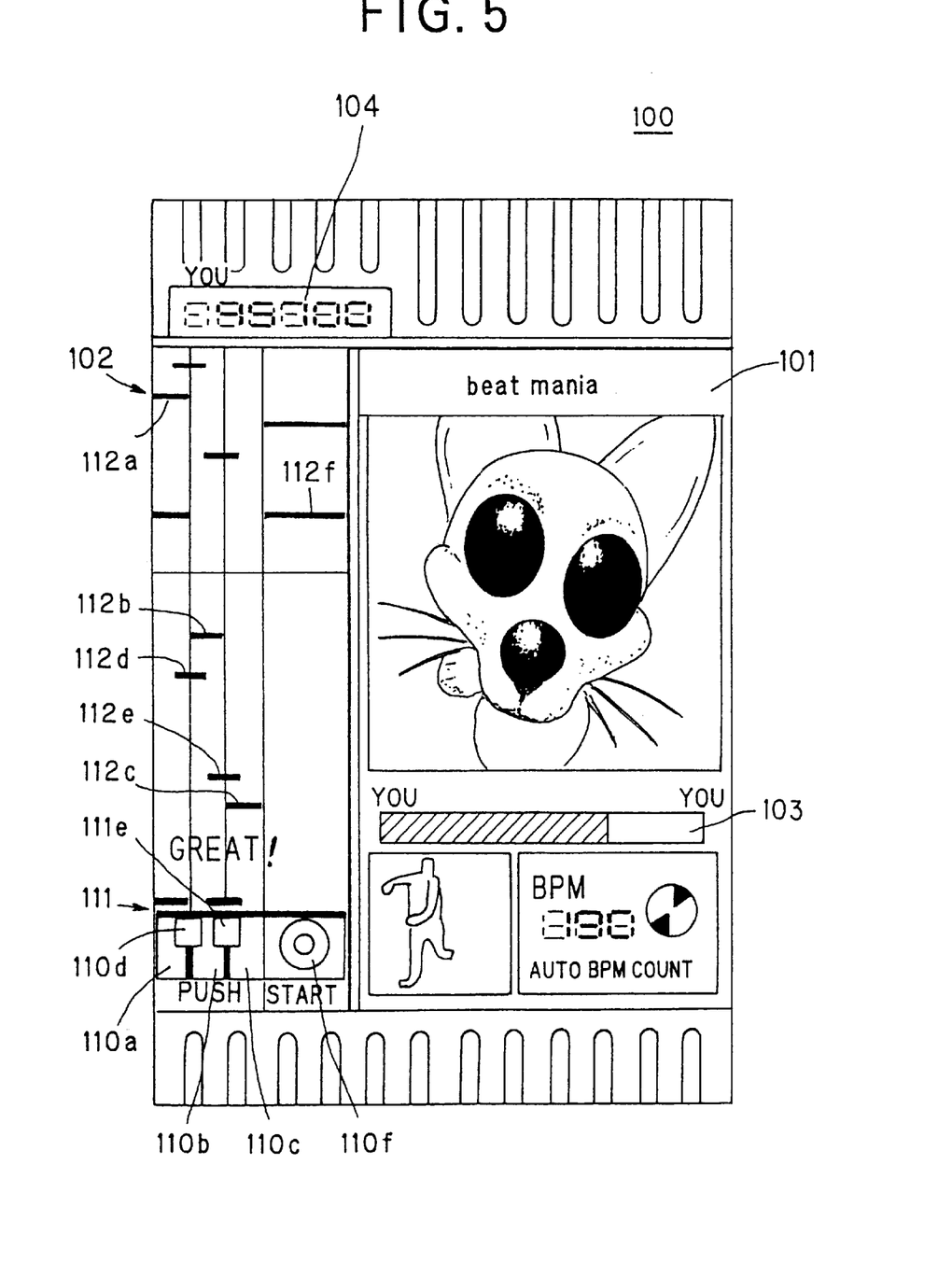
FIG. 5 is a diagram showing an example of a game screen displayed on a monitor in the music game executed on the game device of FIG. 1.

FIG. 5 is a diagram showing an example of a game screen displayed on the monitor 3 in the music game described above. An animation window 101 showing an animation in correspondence with the music, a rhythm pattern gauge 102, a groove meter 103, and a score window 104, are displayed in the game screen 100.

The rhythm pattern gauge 102 guides the player in the procedure for operating the press-switches 5 of the input device 4 based on the operation timing data D3. As described above, since the operation timing data D3 stipulates operation for five keyboards and one turntable, three white key marks 110a, 110b, and 110c, representing white keys of a keyboard instrument, two black key marks 110d and 110e, representing black keys of the keyboard instrument, and a turntable mark 110f representing a record player turntable, are displayed in accordance with the operation timing data D3 at the bottom end of the gauge 102 in alignment with a reference line 111.

Each of the marks 110a to 110f is provided so that it would not duplicate with at least one of the press-switches 5 of the input device 4. For example, the white key marks 110a and 110c correspond to the press-switches 5c and 5h, the white key mark 110b corresponds to the press-switches 5d and 5g, the black key marks 110d and 110e correspond respectively to the press-switches 5a and 5e, and the turntable mark 110f corresponds to the press-switch 5j. To enable the turn-table adapter 10 shown in FIG. 2 to function as a turntable in the game, the turntable mark 110f is always provided in correspondence with the press-switches 5i or 5j. The press-switches 5i and 5j are never provided in correspondence with the marks 110a to 110e, but only with the turntable mark 110f. The relationship between the operation members (five keyboards and one turntable) defined in the operation timing data D3, and the press-switches 5 of the input device 4, is stored beforehand as a table in the ROM 30a.

Timing marks 112a to 112f (hereinafter sometimes represented collectively by reference code 112) are positioned in the left to right direction in correspondence with the marks 110a to 110f, and are displayed in the gauge 102. The display of the timing marks 112 is controlled in the following manner based on the operation timing data D3 of FIG. 4.

When the reproduction of music (a tune) commences, the CPU 20 sets part of the operation timing data D3 corresponding to the tune (e.g. two bars of the tune) as a display object range in the gauge 102, and reads the data in that range into an operation area of the RAM 23. Then, the CPU 20 detects the operation timings of the marks 110a to 110f contained in the range that has been read, and creates image data for the gauge 102 by replacing the detected timings with the timing marks 112. At this time, the display positions of the timing marks 112 are calculated so that the timing marks 112a to 112f are aligned in the time sequence above the reference line 111.

The image data created for the gauge 102 is passed to the image processor 24 together with separately created image data for painting in areas other than the gauge 102. In correspondence with the supplied image data, the image processor 24 paints a game screen 100 on the frame buffer 25, and the painted game screen 100 is displayed on the monitor 3 at a predetermined timing.

The above processing is repeated in a predetermined cycle. The head of the display object range corresponds to the performance position of the tune at that point in the processing, and the display object range is shifted from the head of the tune towards its end by a predetermined distance at each time the processing is performed. Consequently, the timing marks 112 on the gauge 102 move gradually downward as the tune progresses. Then, when the timing marks 112 have reached the reference line 111, the operation timings of the press-switches 5, which are provided in correspondence with the marks 110a to 110f overlapping the marks 112, come into effect. The timing marks 112 corresponding to the imminent operation timings are thereby arranged in time sequence above the reference line 111, enabling the player to easily catch the future operations.

The left side of the groove meter 103 extends and contracts to and from its base point in accordance with an evaluation calculated in the processing of FIG. 7 explained later. A maximum evaluation is achieved when the groove meter 103 has extended to its right end, and the groove meter 103 contracts towards its left end as the evaluation decreases. Scores calculated during the game are displayed in the score window 104.

Figure 6:
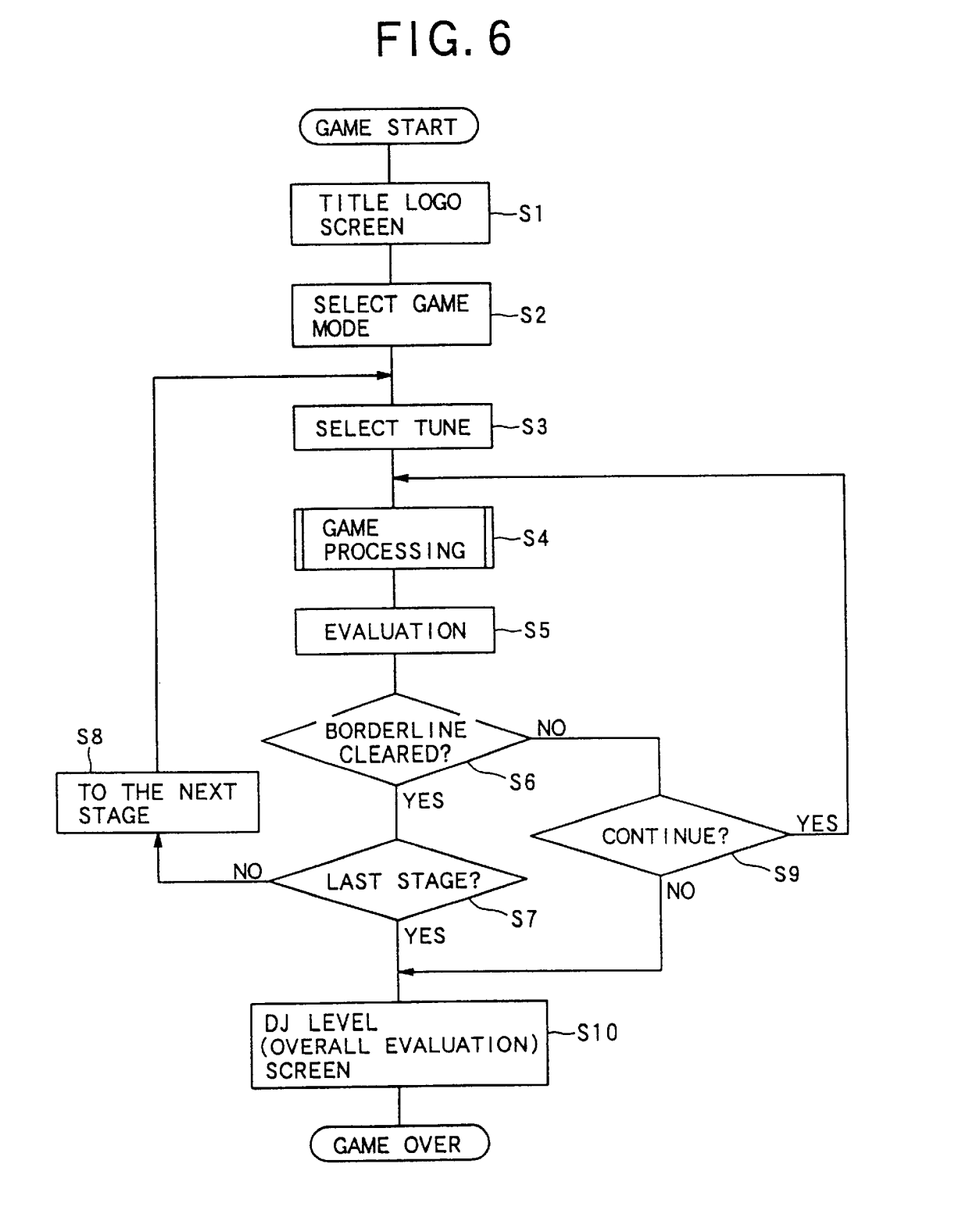
FIG. 6 is a flowchart showing a procedure of a music game executed on the game device of FIG. 1.

FIG. 6 is a flowchart showing a procedure of a music game executed by the CPU 20. In this flowchart, one tune is played in one stage, and when that stage is cleared, the game proceeds to the next stage.

When a predetermined game start operation is performed to the game device 1, firstly, a predetermined title logo is provided on the monitor 3 (Step S1), and thereafter, processing for selecting a game mode is carried out in compliance with a command from the player (Step S2). Here, the level of difficulty, for example, can be selected. Next, processing for selecting a tune is carried out in compliance with a command from the player (Step S3), and when the tune has been selected, game processing is executed (Step S4). The game processing will be explained in detail later. When the game processing ends, the play contents are evaluated (Step S5), and the CPU 20 judges whether or not the play contents have cleared a borderline based on the evaluation result (Step S6). When the borderline has been cleared, the CPU 20 judges whether a final stage has ended (Step S7), and if not, the next stage is selected (Step S8), and the processing returns to the Step S3. When it is judged in the Step S6 that the borderline has not been cleared, the player is asked to confirm whether to replay the current stage (Step S9), the processing returning to the Step S4 if he or she requests the replay, and if not, proceeding to a Step S10. When it is judged in the Step S7 that the game is in the final stage, the processing also proceeds to the Step S10. In the Step S10, an overall evaluation is calculated based on the play contents being performed, and the result is displayed on the monitor 3 as a DJ level. Thereafter, the game ends.

Figure 7:
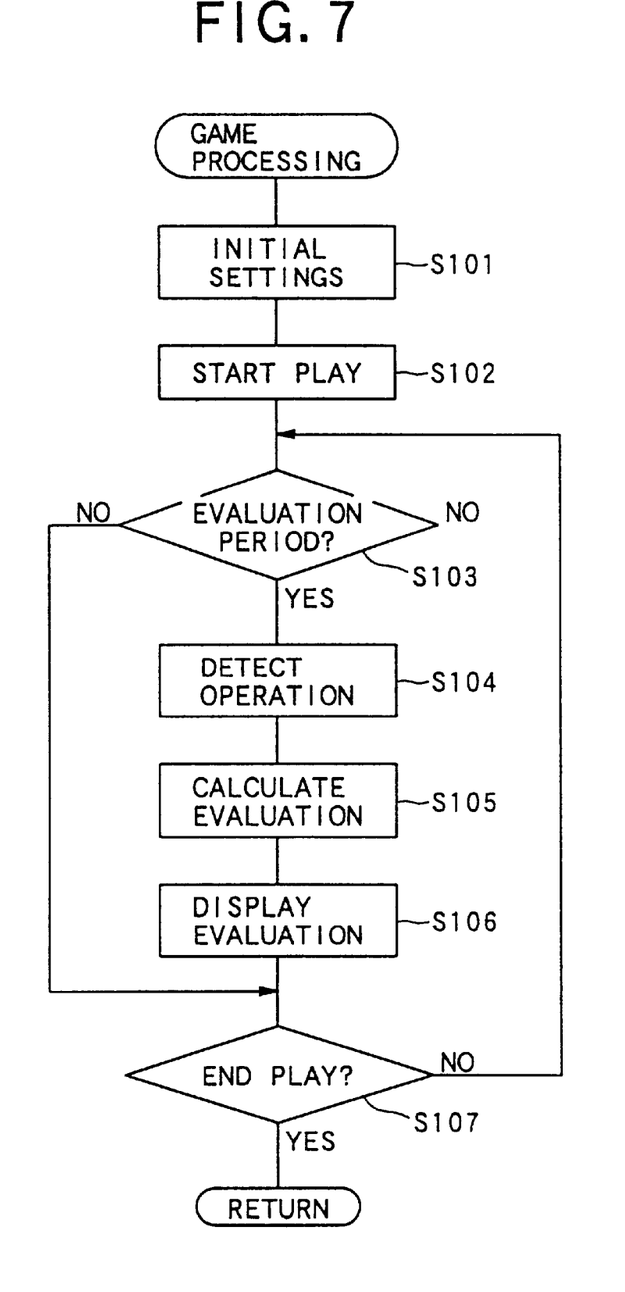
FIG. 7 is a flowchart of game processing executed as a subroutine of FIG. 6.

FIG. 7 is a flowchart showing a procedure of the game processing executed as a subroutine of the Step S4 of FIG. 6. In the game processing, firstly, initial settings required to start the game are performed, such as loading the operation timing data D3 and the music data D1 corresponding to the selected tune. When the initial setting is completed, play starts, the tune is performed (reproduced), and the gauge 102 is displayed (Step S102). Next, it is judged whether there is presently an evaluation period for any of the press-switches 5 corresponding to the marks 110a to 110f (Step S103). The evaluation period is set to a predetermined width centered on the operation timings of the press-switches 5. Then, when it is judged that the game is in the evaluation period, the operation for the press-switches 5 in correspondence with the evaluation period is detected (Step S104), and the operation performed by the player is evaluated based on the deviation between the timing of the operation which has actually been detected and the operation timing stipulated by the operation timing data D3 (Step S105). For example, zero deviation scores 100 points, and deviation of a half of the width of the evaluation period scores zero points. When the evaluation periods of multiple press-switches 5 overlap, each press-switches 5 is evaluated separately. A range of points from 100 to zero is divided into four levels: "Great", "Good", "Bad", and "Poor". Then, in Step S105, it is evaluated to which level the calculated score belongs. The calculated evaluations are stored in the RAM 23, and are used to calculate the overall evaluation in the Steps S5 and S10 of FIG. 6. When an operation has been performed in the Step S104, the sound effect corresponding to that operation is identified based on the table data D4, and the identified sound effect is output from the loudspeaker 32 together with the music being performed.

When an operation is evaluated, the evaluation is displayed in the gauge 102 (Step S106). Here, the gauge 102 displays which of the above four levels the score calculated in the Step S105 belongs to. For example, in FIG. 5, "Great" is displayed. When "Great" or "Good" are displayed, the value of the groove meter 103 extends, and when "Bad" or "Poor" are displayed, the value of the groove meter 103 contracts. When an evaluation is displayed in the Step S106, it is judged whether one tune has ended (Step S107). Then, if the tune has not yet ended, the processing returns to the Step S103. When it is judged that the tune has ended, the game processing ends and the processing continues from the Step S5 of FIG. 6.

In the Step S5 of FIG. 6, an overall evaluation for one tune is calculated based on the scores and levels calculated for each operation. Then, when the performance ends, if the value of the groove meter 103 has reached a fixed level, it is judged in the Step S6 that the stage has been cleared.

In the first stage after the start of the game, the initial value of the groove meter 103 is set to its maximum, and when the evaluation calculated in the Step S105 is less than a fixed standard, for example, when it is "Bad" or "Poor", the value of the groove meter 103 is contracted. When even a small part of the value of the groove meter 103 remains after one tune has ended, it is possible to regard the stage as cleared in the Step S6. In this case, the value of the groove meter 103 need not be increased even when an evaluation of "Great" or "Good" has been obtained, while the play can continue to the next stage by using the remaining value of the groove meter 103 at the point when the preceding stage was cleared as the initial value of the groove meter 103. This type of mode may be prepared as a hidden mode which appears when, for example, fixed conditions have been satisfied.

In the game device 1 described above, since the music data D1 is supplied by the ROM 30a, fewer tunes are stored comparing with the case where a memory medium such as a CD-ROM is used. Accordingly, to supplement the number of tunes, a medley tune combining parts of the stored tunes can be selected.

Figure 8:
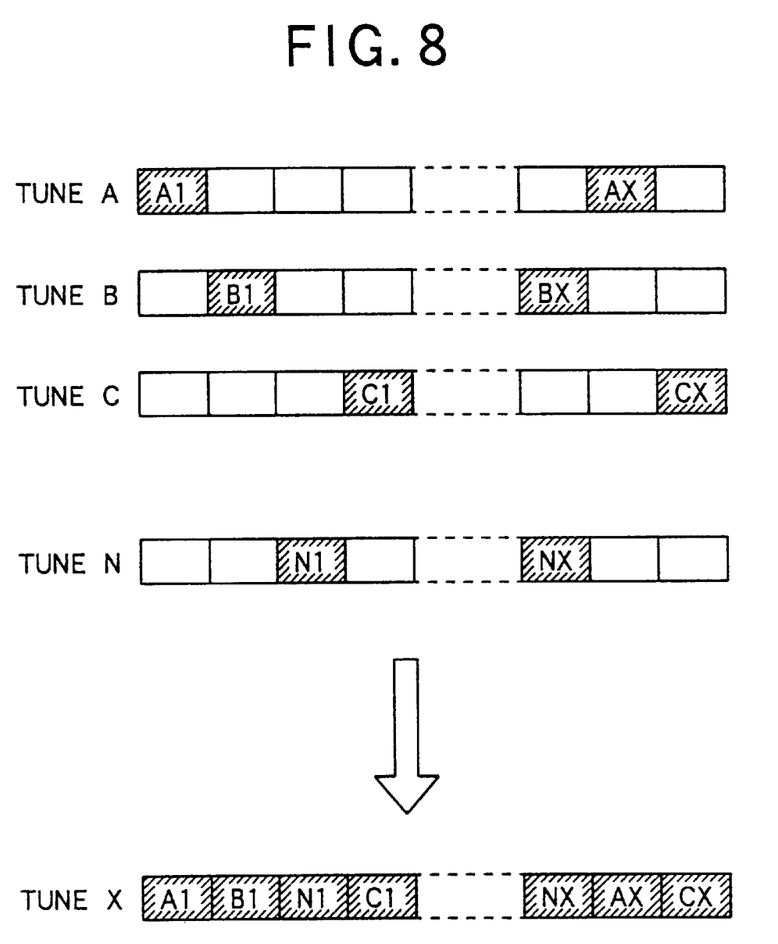
FIG. 8 is a diagram showing the relationship between a tune prepared in advance and a medley tune created therefrom.

FIG. 8 shows an example of a medley tune X. In this example, blocks A1 to AX, B1 to BX . . . N1 to NX of the tunes A to N stored in the ROM 30a are preset as potential constituent elements of the medley tune X. Then, at least part of the blocks of the tunes A to N are linked together to form the medley tune X. The blocks A1 to AX, B1 to BX . . . N1 to NX may have any given length. For example, they may be set to a length corresponding to four bars of each tune. The total length of the medley tune X is set so as to be approximately the same as the length of the tunes A to N (e.g. approximately one minute and thirty seconds). The selected potential blocks A1 to AX, B1 to BX . . . N1 to NX comprise, for example, the most striking parts of the tunes, the parts most suitable to a medley, and the like.

Figure 9:
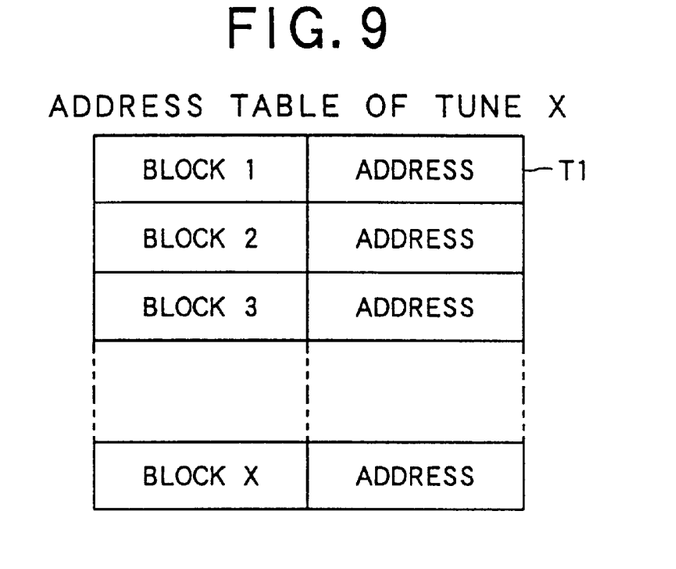
FIG. 9 is a diagram showing an example of a table prepared in order to create a medley tune.

To enable the medley tune X to be reproduced, a table T1 shown in FIG. 9 is stored beforehand in the ROM 30a. The numbers 1 to X of the blocks forming the medley tune X are stored in the table 1 in correspondence with the music data addresses in the ROM 30a of the music data forming each block. Using FIG. 8 by way of example, since the block A1 of the tune A is selected as the first block of the medley tune X, in the table of FIG. 9, the address of the block A1 is specified as the address corresponding to the block number 1. Addresses are similarly specified for the other block numbers.

When the medley tune X has been selected in the Step S3 of FIG. 6, the CPU 20 refers to the table T1 of FIG. 9 and judges the address in the ROM 30a of music data forming the tune X. Then, based on the result of that judgement, music data required for playing the tune X, and the operation timing data and sound effect data corresponding to that data, are read out from the ROM 30a and sent to the RAM 23. By this processing, the game can be played with the medley tune X in the same manner as using the tunes A to N. The data can be transferred from the ROM 30a to the RAM 23 in fixed amounts as the tune progresses, or in a single operation prior to the start of the tune.

In the example described above, the medley tune X has a fixed constitution, but this can be varied. Examples of this will be explained referring to FIGS. 10 to 12.

Figure 10:
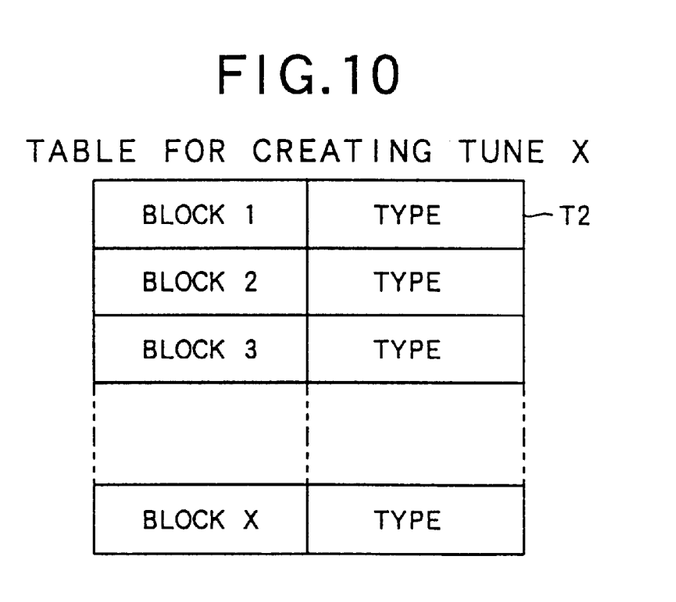
FIG. 10 is a diagram showing another example of a table prepared in order to create a medley tune.

FIG. 10 shows a table T2 which is stored in the ROM 30a instead of, or in addition to, the table T1 of FIG. 9, for forming the medley tune X. The numbers 1 to X of the blocks forming the medley tune X, and the types of the music data forming each block, are stored in correspondence with each other in the table T2. The music data types comprise, for example, information representing musical characteristics of the tunes such as tune codes and tempi, or information representing characteristics in the game such as the level of difficulty. That is, the table T2 of FIG. 10 does not directly specify the blocks forming the tune X, but specifies only the type of music performed in correspondence with the blocks. Therefore, when the block is of a type specified in the table T2, any of the blocks from the candidate tunes A to N can be selected, enabling the constitution of the tune X to be changed.

Figure 11A:
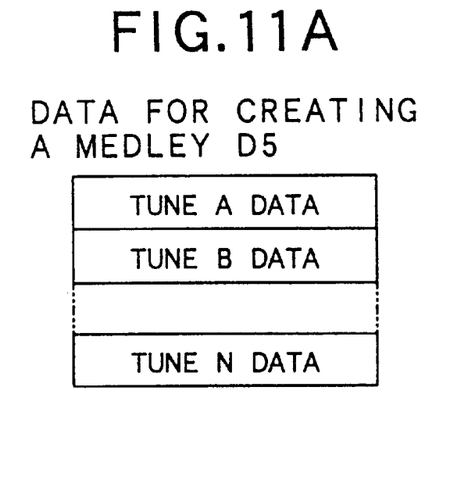
FIGS. 11A to 11C are diagrams showing data for creating a medley prepared in order to create a medley tune combined with the table of FIG. 10.
Figure 11B:
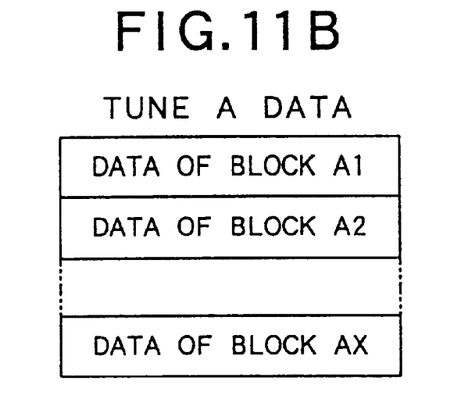
Figure 11C:
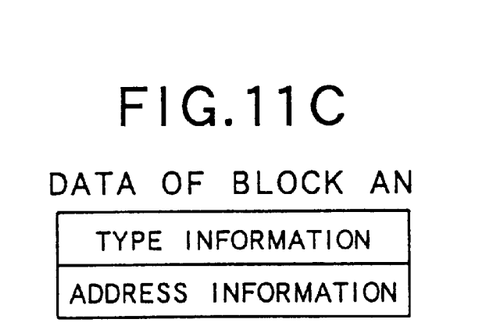

FIGS. 11A to 11C show constitutions of data for creating a medley D5 stored in the ROM 30a in correspondence with the table T2 of the tune X. As shown in FIG. 11A, the data for creating a medley D5 is classified into data relating to each tune of A to N. Furthermore, as shown in FIG. 11B, the tune A data is classified into data relating to each block of A1 to AN selected from the tune A as potential blocks for forming a medley tune. The data for the other tunes B to N has a similar constitution. Then, as shown in FIG. 11C, which shows the block AN as an example, data relating to the blocks A1 to AN comprises type information for identifying types of the blocks A1 to AN, and information specifying addresses of the blocks A1 to AN in the ROM 30a. The type information comprises information relating to the musical characteristics such as codes and tempi of the block in correspondence with the types in the table T2 of FIG. 10, and information relating to characteristics in the game such as the level of difficulty. By referring to the type information and the address information, it is possible to detect a block having the same type as the type specified in the table T2 of FIG. 10, and identify its address.

Figure 12:
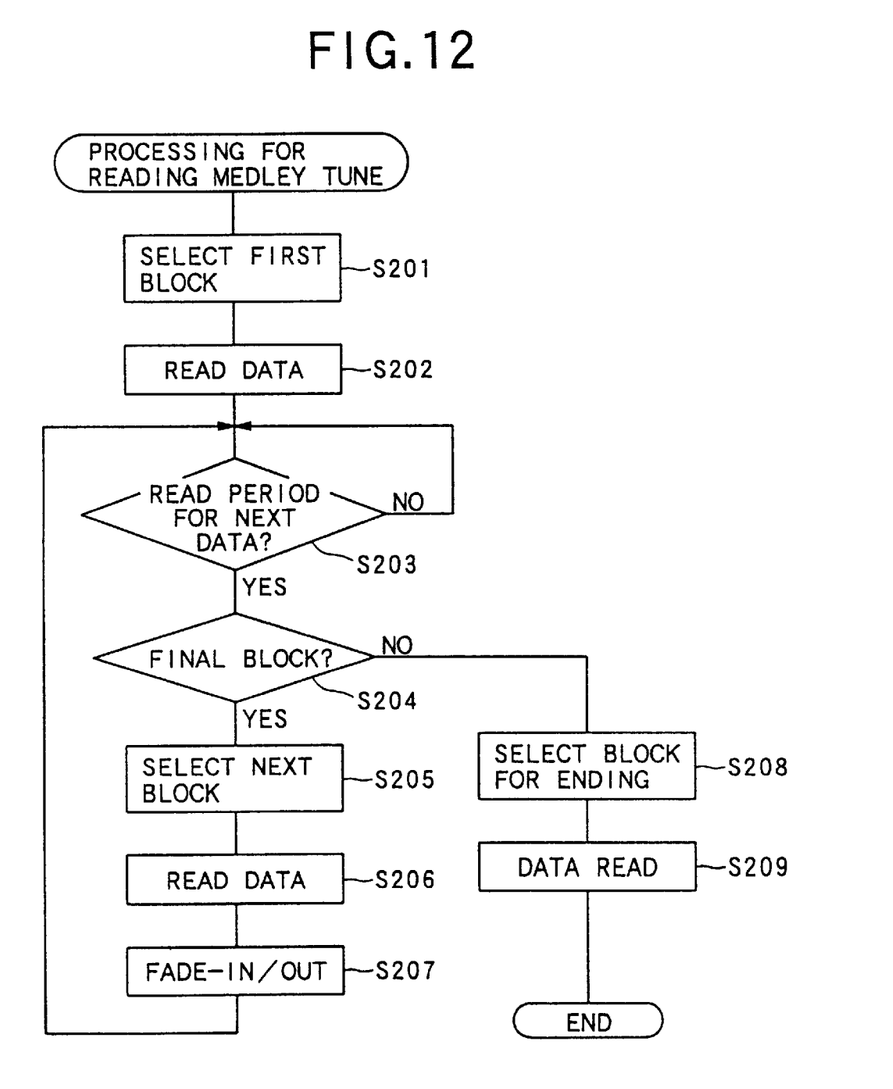
FIG. 12 is a flowchart showing a procedure of medley tune read processing executed to reproduce a medley tune using the data of FIG. 10 and FIGS. 11A to 11C

FIG. 12 is a flowchart showing a procedure by which the CPU 20 reads the music data D1 or the like from the ROM 30a to an operation area of the RAM 23, when the medley tune X has been selected. This processing is executed simultaneous to other processing (for example, the processing of FIG. 7) while the game is being played.

When the medley tune X is selected, firstly, the CPU 20 refers to the table T2 and detects the type of music data forming the first block. Then, the CPU 20 consults the type information contained in the data for creating a medley D5 of FIG. 1, extracts the block having the same type as the type specified in the table T2, and gets the address for that block (Step S201). When multiple blocks have been extracted, one block is re-extracted from the multiple blocks using, for example, a random number. Alternatively, priority may be given to a block having a level of difficulty corresponding to the present value of the groove meter 103. That is, the larger the value of the groove meter 103, the higher the level of difficulty of the selected block.

Next, music data corresponding to the obtained address, and operation timing and sound effect data corresponding to the music data, are read in an operation area of the RAM 23 (Step S202). The output of BGM and sound effects in correspondence with operation of the press-switches 5 is controlled based on the data read at this time. In addition, the display of the gauge 102 and the evaluation of the operation of the press-switches 5 are also controlled based on the data read at this time.

After the processing of the Step S202, it is judged whether the period for reading the next data has been reached (Step S203). For example, when one block has a length equivalent to four bars, it is judged whether the period for reading the next data has been reached according to the time lapse since the start of that block. When it is judged that it is not the period for reading the next data, the processing of the Step S203 is repeated. When it has been judged that it is the period for reading the next data, it is judged whether the next block will be the last block (Step S204). Whether or not a block is the last block may be judged based on the next block number in the table T2, for example, or based on the time lapse since the start of the tune X.

When it is judged that the next block is not the last block, the next block is selected (Step S205). This block is selected by the same processing as in the Step S201, wherein the CPU 20 refers to the table T2, and detects the type of the music data forming the next block. Then, the CPU 20 refers to the type information contained in the data for creating a medley D5 of FIG. 11, and extracts the block having the same type as the type specified in the table T2. When multiple blocks have been extracted, one block is re-extracted as in the Step S201. Then, an address corresponding to the extracted block is obtained, music data corresponding to the obtained address, and a operation timing and sound effect data corresponding to the music data, are read in an operation area of the RAM 23 (Step S206).

After reading the data of the next block, fade-in/out processing is carried out (Step S207). In this processing the volume of the tune presently being performed gradually lowers, while simultaneously the volume of the next tune to be performed gradually increases. For example, when music data comprising PCM data is being loaded on the RAM 23, fade-in/out can be performed by gradually lowering the output level of the tune presently being performed by multiplying by 0.9, 0.8, . . . , while increasing the output level of the next tune by multiplying by 0.1, 0.2, . . . in synchronism therewith, thereby synthesizing the signal waveforms of both tunes and passing them to the sound processor 26. Elements on the game screen 100 may also be faded in conjunction with the fade-in/out. For example, since the marks 112 of the gauge 102 and the animation window 101 of FIG. 5 have a very close relationship to the tune reproduction, they may be faded in and out in line with the tune volume.

When the fade-in/out processing ends, the processing returns to the Step S203. The processing of the Steps S203 to S207 is repeated until the last block is detected in the Step S204. Then, when it is judged in the Step S204 that the next block is the last block, a block suitable for the ending is selected (Step S208), and music data corresponding to the block, and a operation timing and sound effect data corresponding to the music data, are read in an operation area of the RAM 23 (Step S209). Then, the reading of the data for creating a medley thereby ends. The block suitable for the ending is typically the last block of one of the tunes A to N. In order to enable the block to be selected in the Step S208, information for judging whether the blocks can be used for ending may be included in the type information of FIG. 11.

The present invention is not limited to the embodiment described above, and various modifications are possible. For example, the blocks forming the medley tune can be selected by a method other than that described above, there being various possible modifications. The length of the medley tune need not be approximately the same as that of the other tunes. For example, the end of the medley tune may be corresponded with the groove meter 103. That is, the medley tune may continue uninterruptedly, unless the value of the groove meter 103 drops to zero (shrinks completely to the left end). In this case, the initial value of the groove meter 103 may be set to its maximum at the start of the medley tune, and if the evaluation calculated in the Step S105 of FIG. 7 is less than a fixed standard, for example, "Bad" or "Poor", then the value of the groove meter 103 may be decreased.

In the embodiment described above, when multiple next blocks have been extracted in the Steps S201 and S205 of FIG. 12, a block is re-extracted by referring to the level of difficulty of the blocks, but alternatively, it is acceptable to refer to the evaluation at that point (for example, the value of the groove meter 103), and select a block having a level of difficulty corresponding to the evaluation during the determination of the next block.

The tables T1 and T2 of FIG. 9 and FIG. 10 may be released to the player, allowing him or her to freely specify the constitution of the medley tune. The present invention is not limited to a portable game device, but may also be applied to an arcade game for business, and an installation game device for home. The music data and operation timing data may be supplied by a magnetic memory medium such as a hard disk, or an optical memory medium such as a CD-ROM. However, since these memory media have a lower read speed than a semiconductor memory, preliminary processing, such as sending all the data to be used for playing the medley tune to the RAM, should preferably be carried out prior to performing the medley tune.

The method for making the contents of the medley tune X variable is not limited to that described above, and at least one part of the type information of FIG. 11C may comprise information for judging which block to be linked next, the next block being extracted after referring to the information in the Step S205 of FIG. 12.

For example, all the blocks selected as potential blocks for the medley tune are divided into blocks A having a fast tempo, and blocks B having a slow tempo. Information specifying a probability of 80% that a block A will be selected as the next block is provided in the type information of the blocks classified as blocks A, and a probability of 20% that a block B will be selected as the next block, is provided in the type information of the blocks classified as blocks A. On the other hand, information specifying a probability of 80% that a block B will be selected as the next block is provided in the type information of the blocks classified as blocks A, and a probability of 20% that a block A will be selected as the next block, is provided in the type information of the blocks classified as blocks B. Then, in the Step S205 of FIG. 12, a block A or a block B is identified in compliance with the probability specified by the type information corresponding to a block presently being reproduced, and one more block is selected from the blocks classified as blocks A or B. In this example, when a block A is selected, the tune that follows is liable to have a fast tempo, and when a block B is selected, the tune that follows is liable to have a slow tempo. In this example, the block may be extracted during the processing of the Step S205 by using the value of the groove meter 103 and the table T2. By changing the probability specifying the blocks in accordance with their states, the level of difficulty and the atmosphere of the game can be controlled.

The relationship between the input device 4 and the press-switches 5 is not limited to that described above, and various alterations are possible. For example, when the timings at which the press-switches 5 are pressed matches the number of switches 5 pressed at that timing, the operation may be evaluated as correct.

What is claimed is:

1. A turn-table adapter capable of being attached to a game device provided with a press-switch serving as an operation member of an input device, said turn-table adapter comprising:
   a clip to be detachably mounted on a case of the game device; and
   an operation disk attached to one arm of the clip and rotatably operable by a player,
   wherein a rotational operation of the operation disk can be converted into a pushing-down operation of the press-switch, and wherein the clip is provided with a shaft passing through said one arm, the shaft being coaxially provided at both ends thereof with the operation disk and a press-in disk, and a lower surface of the press-in disk opposite to the case being provided with a bump for depressing the press-switch.

2. The turn-table adapter according to claim 1, wherein the case is provided with an element necessary for assembling the game device, the clip being mounted on the case using said element.

3. The turn-table adapter according to claim 1, wherein the case is provided with a hole serving as an element necessary for assembling the game device, another arm of the clip being provided with a bump to be fitted to the hole.

4. The turn-table adapter according to claim 1, wherein the game device is configured as a portable game device.

5. The turn-table adapter according to claim 1, wherein said second side of said case has a hole for effecting assembly of said game device and said second arm has an engaging member engageable with said hole.

6. A turn-table adapter capable of being attached to a game device provided with a press-switch serving as an operation member of an input device, said turn-table adapter comprising:

a clip to be detachably mounted on a case of the game device; and an operation disk attached to one arm of the clip and rotatably operable by a player, wherein a rotational operation of the operation disk can be converted into a pushing-down operation of the press-switch, and wherein a bottom surface of the operation disk opposite to said one arm is formed as an end face cam, said one arm being provided with a pin movable in an axial direction of the operation disk, and a rotation of the operation disk being converted into a movement of the pin in the axial direction to thereby depress the press-switch.

7. The turn-table adapter according to claim 6, wherein the case is provided with an element necessary for assembling the game device, the clip being mounted on the case using said element.

8. The turn-table adapter according to claim 6, wherein the case is provided with a hole serving as an element necessary for assembling the game device, another arm of the clip being provided with a bump to be fitted to the hole.

9. The turn-table adapter according to claim 6, wherein the game device is configured as a portable game device.

10. A turn-table adapter capable of being attached to a game device provided with a press-switch serving as an operation member of an input device, said turn-table adapter comprising:

a clip mountable on a case of the game device;

a shaft passing through one arm of the clip;

an operation disk coaxially provided to the shaft at one end thereof; and a press-in disk coaxially provided to the shaft at another end thereof, wherein another arm of the clip is provided with a bump to be fitted to a hole formed on the case to serve as an element necessary for assembling the game device, a bottom surface of the press-in disk opposite to the press-switch being formed with a bump, and an integral rotation of the operation disk and the press-in disk allowing the bump of the press-in disk to rise onto the press-switch to thereby depress the press-switch.

11. A turn-table adapter capable of being attached to a game device provided with a press-switch serving as an operation member of an input device, said turn-table adapter comprising:

a clip mountable on a case of the game device;

a shaft attached to one arm of the clip; and an operation disk provided to the shaft at one end thereof, wherein said one arm is provided with a pin movable in an axial direction of the shaft, another arm of the clip being provided with a bump to be fitted to a hole formed on the case to serve as an element necessary for assembling the game device, a lower surface of the operation disk opposite to the press-switch being formed as an end face cam, and a rotation of the operation disk being converted into a movement of the pin in an up-and-down direction to thereby depress the press-switch.

12. A turn-table adapter for mounting on a game device having a press-switch on a first side and an opposing second side, said turn-table adapter comprising:

a clip having a first arm engaging said first side and a second arm engaging said second side;

a shaft rotatably mounted in said first arm and having a first end and a second end;

a rotatable input member mounted on a first end of said shaft for operation by a player;

an actuation member mounted on said second end of said shaft to rotate with said rotatable input member; and said actuation member having a lower surface opposing said press-switch and a convex portion provided thereon engageable with said press-switch in response to rotation of said rotatable input member for effecting depression of the press-switch.

13. The turn-table adapter according to claim 12, wherein said second side of said case has assembly structure for effecting assembly of said game device and said second arm engages said assembly structure.

14. A turn-table adapter for mounting on a game device having a press-switch on a first side and an opposing second side, said turn-table adapter comprising:

a clip having a first arm engaging said first side and a second arm engaging said second side;

a shaft rotatably mounted in said first arm and having a first end and a second end;

a rotatable input member mounted on a first end of said shaft for operation by a player;

said rotatable input member having a bottom surface opposite to said first arm having a cam structure;

a press-switch engaging member movably mounted on said first arm and disposed such that said cam structure engages said press-switch engaging member to move the press-switch engaging member into actuating contact with said press-switch in response to rotation of said rotatable input member.

15. The turn-table adapter according to claim 14, wherein said second side of said case has assembly structure for effecting assembly of said game device and said second arm engages said assembly structure.

16. The turn-table adapter according to claim 14, wherein said second side of said case has a hole for effecting assembly of said game device and said second arm has an engaging member engageable with said hole.

* * * * *